United States Patent [19]

Rudesill

[11] Patent Number: 5,778,767
[45] Date of Patent: Jul. 14, 1998

[54] DISPENSER APPARATUS

[75] Inventor: Brian R. Rudesill. Oakdale. Minn.

[73] Assignee: Base Design, Inc.. Hudson. Wis.

[21] Appl. No.: 818,768

[22] Filed: Mar. 14, 1997

[51] Int. Cl.$^6$ .................... A47J 37/00; A47J 37/12
[52] U.S. Cl. ............... 99/407; 99/336; 99/517;
221/150 R; 221/203; 221/265
[58] Field of Search ............ 99/330–336, 403–407,
99/410, 357, 417, 484, 485, 516, 517; 62/68,
136, 341; 221/150 R, 150 A, 150 HC, 2,
203, 263, 265, 93, 96; 426/243, 519, 523

[56] References Cited

U.S. PATENT DOCUMENTS

| | | |
|---|---|---|
| 1,165,907 | 12/1915 | Riddle . |
| 2,772,818 | 12/1956 | McLauchlan . |
| 2,863,590 | 12/1958 | Giesse . |
| 4,410,553 | 10/1983 | McGinty ................... 426/243 |
| 4,438,683 | 3/1984 | Bartfield ................... 99/330 |
| 4,478,140 | 10/1984 | Bullock ................... 99/407 X |
| 4,505,193 | 3/1985 | Mariotti ................... 99/330 |
| 4,586,429 | 5/1986 | Hawkins . |
| 4,707,997 | 11/1987 | Bigler et al. ................ 62/341 |
| 4,964,535 | 10/1990 | Curwen . |
| 5,052,288 | 10/1991 | Marquez . |
| 5,104,002 | 4/1992 | Cahlander . |
| 5,132,914 | 7/1992 | Cahlander . |
| 5,172,328 | 12/1992 | Cahlander et al. .......... 99/325 |
| 5,174,470 | 12/1992 | North et al. ............. 221/150 HC |
| 5,191,918 | 3/1993 | Cahlander . |
| 5,205,129 | 4/1993 | Wright et al. .............. 62/68 |
| 5,275,090 | 1/1994 | Connell ................... 99/336 |
| 5,282,498 | 2/1994 | Cahlander . |
| 5,285,719 | 2/1994 | McFadden et al. .......... 99/483 X |
| 5,353,847 | 10/1994 | Cahlander . |
| 5,404,797 | 4/1995 | Millar ................... 99/407 |
| 5,556,000 | 9/1996 | Covington et al. ......... 221/150 A |
| 5,586,486 | 12/1996 | Nitschke et al. ........... 99/407 X |

*Primary Examiner*—Timothy F. Simone
*Attorney, Agent, or Firm*—Palmatier, Sjoquist, Helget & Voigt, P.A.

[57] ABSTRACT

A dispenser for dispensing a predetermined quantity of food articles, such as frozen french fries, frozen chicken pieces, cheese sticks, and the like, having a support structure supporting a hopper, the hopper having a storage area positioned over an exit opening and a dispenser drum between the storage area and the exit opening. The dispenser drum is rotatably mounted in the hopper between two end walls on the hopper. The dispenser drum has an axis of rotation, a sealing lip at a first radius perpendicular to the axis of rotation and a catching lip at a second radius perpendicular to the axis of rotation. The second radius is longer than the first radius creating a non-cylindrical shaped dispenser drum. A diverter is pivotally mounted in the hopper. The diverter is positioned to be bumped by the dispenser drum to jostle food articles in the storage area. A driver portion is mounted on the support structure to engage and rotate the dispenser drum about the axis of rotation. The dispenser drum pivots from a filling position to a dump position and back to the filling position.

20 Claims, 8 Drawing Sheets

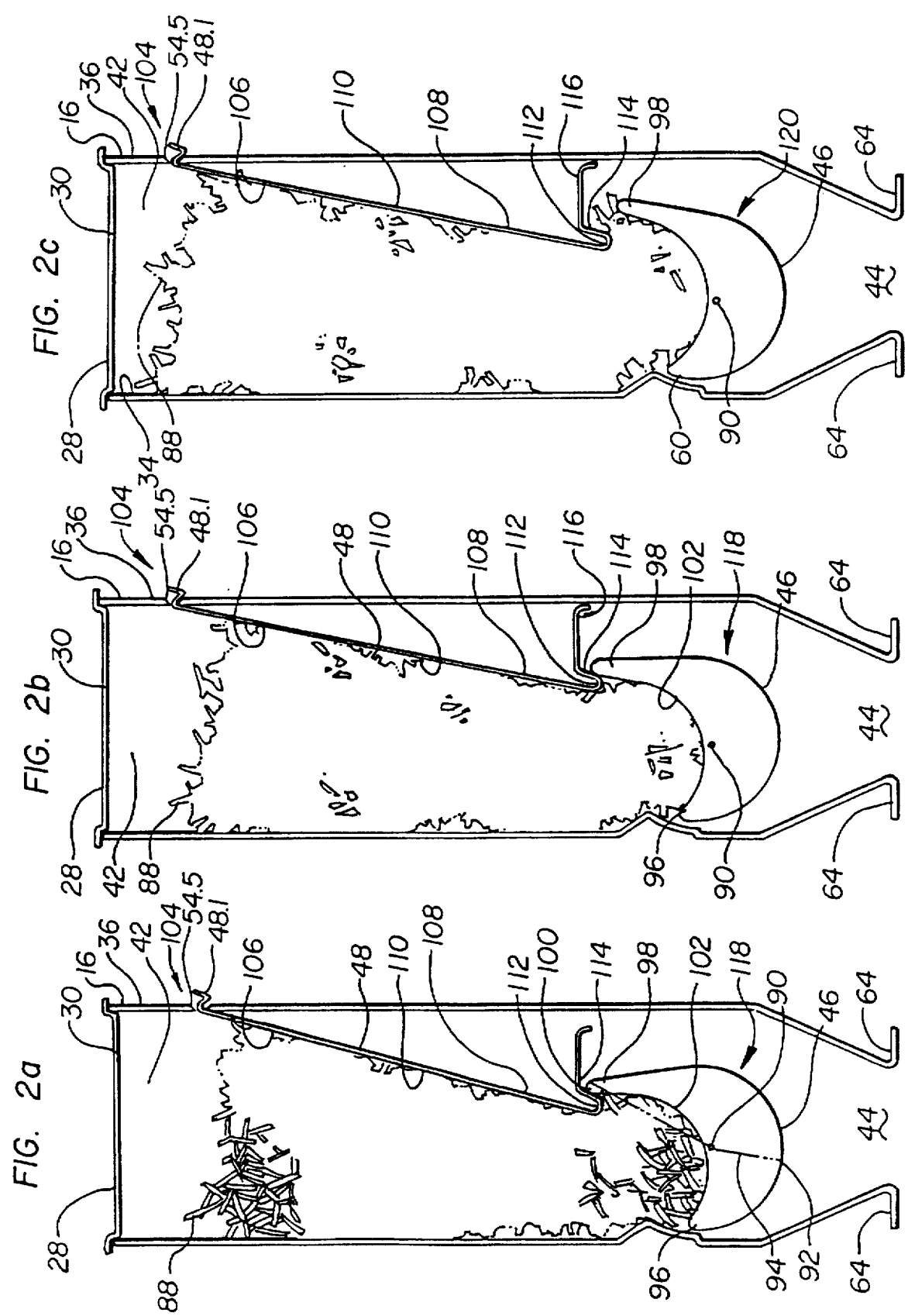

DISPENSER APPARATUS

The present invention relates to a dispenser apparatus. More particularly, the present invention relates to a dispenser apparatus for frozen food articles.

BACKGROUND OF THE INVENTION

Food articles have been preprocessed, packaged and frozen prior to delivery to restaurants as a means to quickly prepare the food for consumption by restaurant patrons. With some food articles, bulk packaging requires that the restaurant open a bulk package and dispense a measured portion to be cooked or otherwise processed for consumption. The remaining food articles in the bulk package must be kept together to retain the chilled temperature.

Dispensers must separate a predetermined quantity of the food articles from the bulk package without crushing or damaging the remaining food articles. The quantity of food articles dispensed must be consistent from machine cycle to machine cycle to properly portion food servings. Furthermore, dispensers handling food products should be modular for handling a variety of food products and easily cleanable to prevent contamination.

The food articles positioned in the dispenser prior to allocation, may begin to warm slightly causing them to adhere to each other forming a block of food particles that may clog in the dispenser. The dispenser should have a means for jostling the food products to loosen the individual food products in the block to prevent jamming of the dispenser or damage to the food articles. The present invention provides a dispenser apparatus to overcome these obstacles in dispenser food articles.

SUMMARY OF THE INVENTION

A dispenser for dispensing a predetermined quantity of food articles, such as frozen french fries, frozen chicken pieces, cheese sticks, and the like, having a support structure supporting a hopper, the hopper having a storage area positioned over an exit opening and a dispenser drum between the storage area and the exit opening. The dispenser drum is rotatably mounted in the hopper between two end walls of the hopper. The dispenser drum has an axis of rotation, a sealing lip at a first radius perpendicular to the axis of rotation and a catching lip at a second radius perpendicular to the axis of rotation. The second radius is longer than the first radius creating a non-cylindrical shaped dispenser drum. A diverter is pivotally mounted in the hopper. The diverter is positioned to be bumped by the dispenser drum to jostle food articles in the storage area. A driver portion is mounted on the support structure to engage and rotate the dispenser drum about the axis of rotation. The dispenser drum pivots from a filling position to a dump position and back to the filling position. At the filling position, the catching lip of the dispenser drum bumps the diverter to jostle the frozen food articles to prevent hangups in the hopper. A logic portion is located on the support structure for controlling and limiting the driver portion which rotates the dispenser drum. The logic portion includes a basket sensor to detect the presence of a new basket in the support structure, a position indicator indicating the rotational position of the dispenser drum and circuitry configured to rotate the dispenser drum in a first direction for dumping and a second direction for filling.

An object of the invention is to provide a modular, easy to clean dispenser apparatus for dispensing frozen food articles.

A feature of the present invention is a dispenser having a pivotally mounted diverter in a hopper.

Another feature of the present invention is a movable diverter in the hopper for engaging the dispenser drum to jostle food articles in the hopper.

Another feature of the present invention is a non-cylindrical shaped dispenser drum for controlling the falling of articles from the storage area past the dispenser drum into the exit area of the hopper.

Another feature of the present invention is a shelf removably mounted on the support structure for supporting food receptacles such as baskets which receive food articles dispensed from the exit area, the shelf having a grease trap to retain grease brought to the dispenser by the basket.

Another feature of the present invention is a logic portion which oscillates the dispenser drum between a filling position and a dump position in less than 360° of travel.

Another feature of the present invention is a hopper formed from an insulating material for keeping frozen food products, dumped from a bulk storage package into the hopper, in a chilled condition.

An advantage of the present invention is that the dispenser drum is configured to minimize breakage of food articles.

Another advantage of the present invention is that the dispenser is modular and may be configured with one to four independently controlled hoppers for dispensing a variety of food articles.

Another advantage of the present invention is that the hoppers may be removed from the dispenser and be replaced with a replacement hopper for quickly changing food articles to be dispensed.

Another advantage of the present invention is that the dispenser drum may be quickly removed from the hopper for cleaning or replacement.

Another advantage of the present invention is that all of the components may be made out of stainless steel or food handling quality plastic such as high density polyethylene for meeting requirements of the food service industry.

Another advantage of the present invention is that the dispenser is lightweight and inexpensive to manufacture.

Another advantage of the present invention is that minimum breakage occurs to the food articles upon dispensing.

BRIEF DESCRIPTION OF THE DRAWINGS

FIG. 2A is a detail section view taken at approximately 2—2 of FIG. 1 illustrating the dispenser drum bumping the diverter in the filling position.

FIG. 2B is a section view taken at approximately 2—2 of FIG. 1 illustrating the dispenser drum in the filling position.

FIG. 2C is a section view taken at approximately 2—2 of FIG. 1 illustrating the dispenser drum in an intermediate position between the filling and the catch positions.

DETAILED DESCRIPTION OF THE PREFERRED EMBODIMENTS

Figure 1:
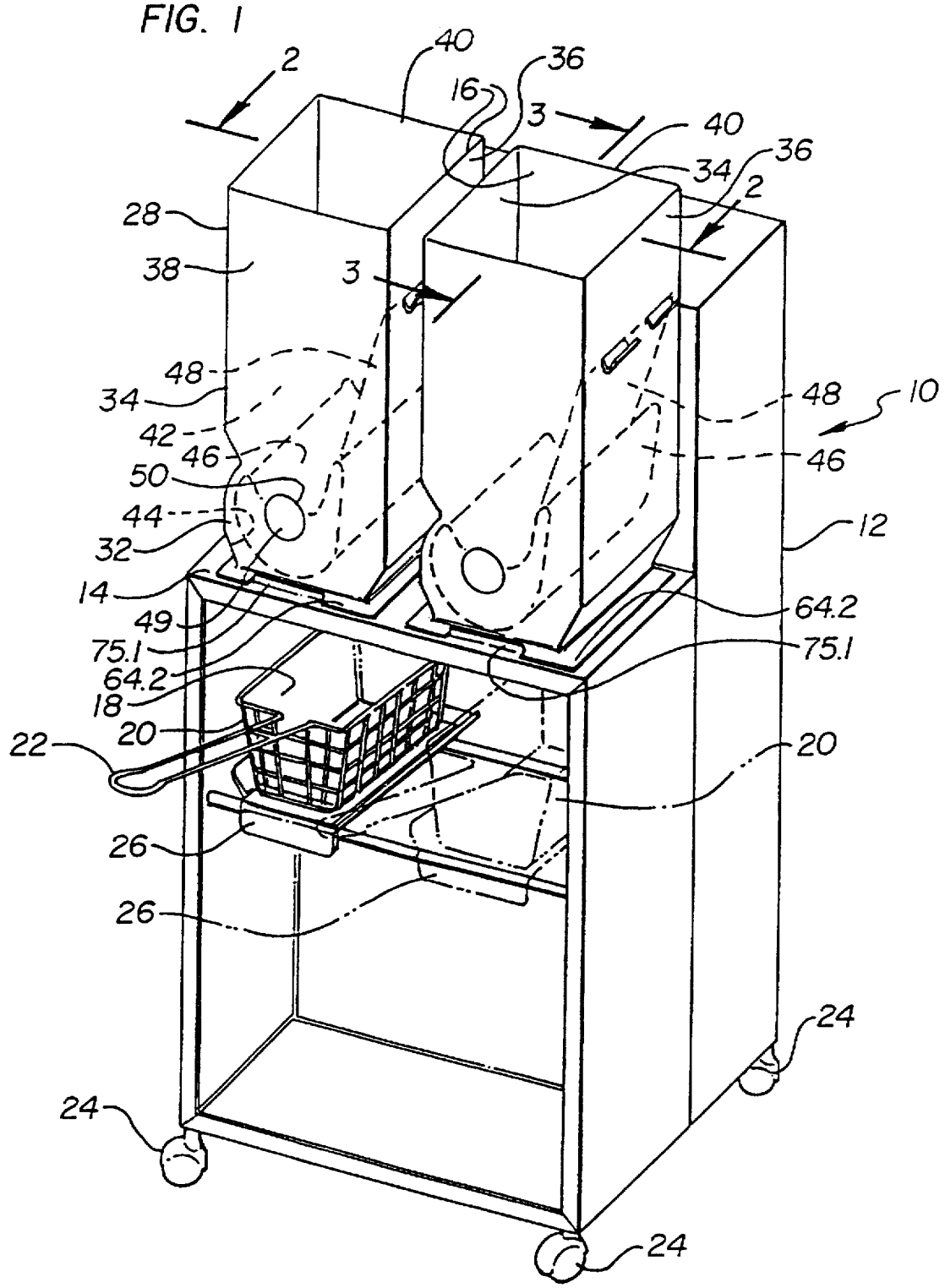
FIG. 1 is a perspective view of the dispenser apparatus illustrating a two-hopper device.

Referring to FIG. 1, the dispenser unit 10 is illustrated having a support structure 12 having a hopper shelf 14 supporting two hoppers 16. Food receptacles 18, such as wire mesh baskets 20, are positioned below each hopper 16 to receive food articles 88 dispensed from the hopper 16. (FIGS. 1 and 2a) The wire mesh baskets 20 may have a handle 22 for transporting the wire mesh baskets 20 between the dispenser unit 10 and a cooking or processing area (not shown). The support structure 12 may be mounted on wheels 24. The food receptacles 18 are supported by a basket tray 26.

Continuing to refer to FIG. 1, the hopper 16 has a top 28 closed by a cap 30 and a bottom 32 resting on the hopper shelf 14. (FIG. 2) The hopper 16 has a first sidewall 34 and a second sidewall 36 and a pair of opposing end walls 38, 40. A storage area 42 is defined between the end walls 38, 40 connected to the first and second sidewalls 34, 36 respectively, and the top 28. An exit opening 44 is defined by the bottom 32 of the hopper 16 for dispensing food articles 88 from the hopper 16 to the food receptacles 18. (FIGS. 2 and 2a) The dispenser drum 46 and one form of a diverter 48 are illustrated in outline in FIG. 1. The dispenser drum 46 has an idler end 49 which extends through a first dispenser drum opening 50 in end wall 38. A first diverter opening 52 may be provided in end wall 38 for pivotally accepting diverter rod 54 in end wall 38. (FIG. 9) An alternative pivoting means for the diverter 48 is illustrated in FIGS. 2a–2e which includes pivoting tabs 48.1 which are integral to the diverter 48. The pivoting tabs 48.1 are preferably slidably coupled to receiving slots 54.5 which extend through the second sidewalls 36. The pivotal coupling of the pivoting tabs 48.1 to the receiving slots 54.5 enables a diverter 48 to be easily separated and removed from the hopper 16 for cleaning.

Figure 2:
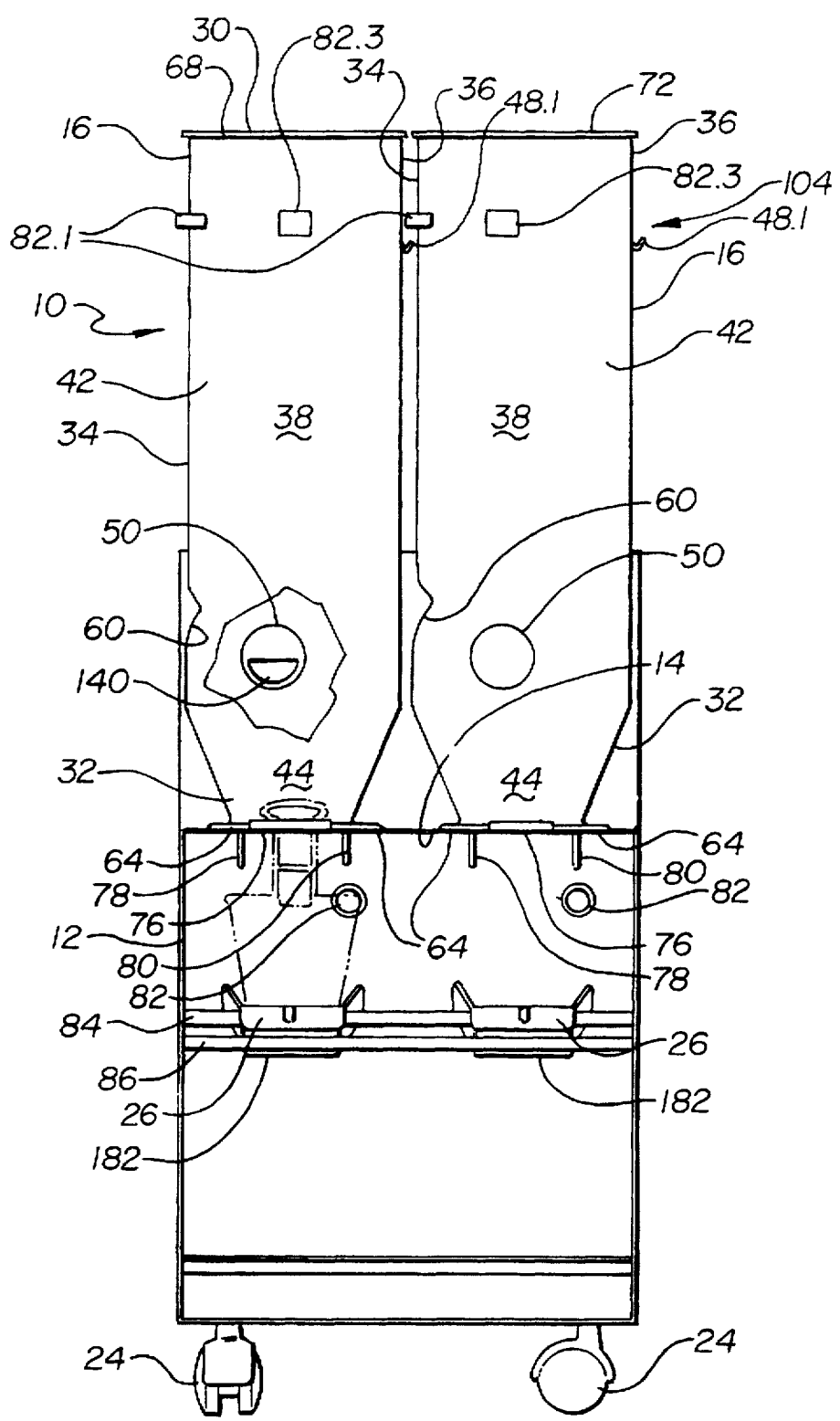
FIG. 2 is a section view taken at approximately 2—2 of FIG. 1 illustrating the dispenser having the baskets and the dispenser drums removed.
Figure 2E:
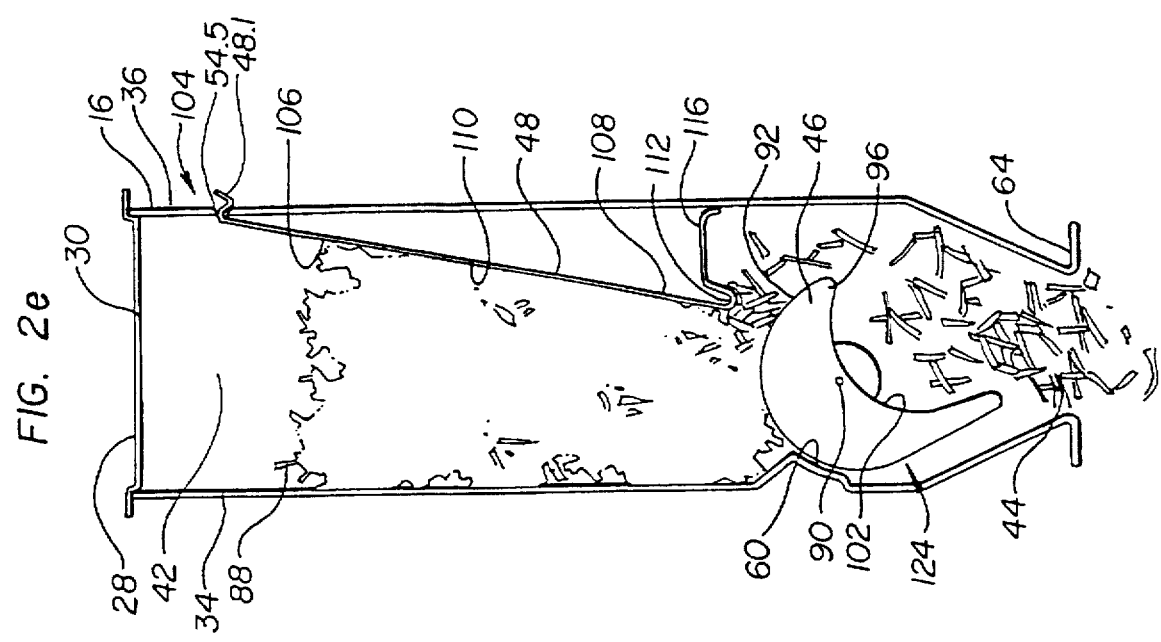
FIG. 2E is a section view taken at approximately 2—2 of FIG. 2 illustrating the dispenser drum in the dump position.
Figure 2D:
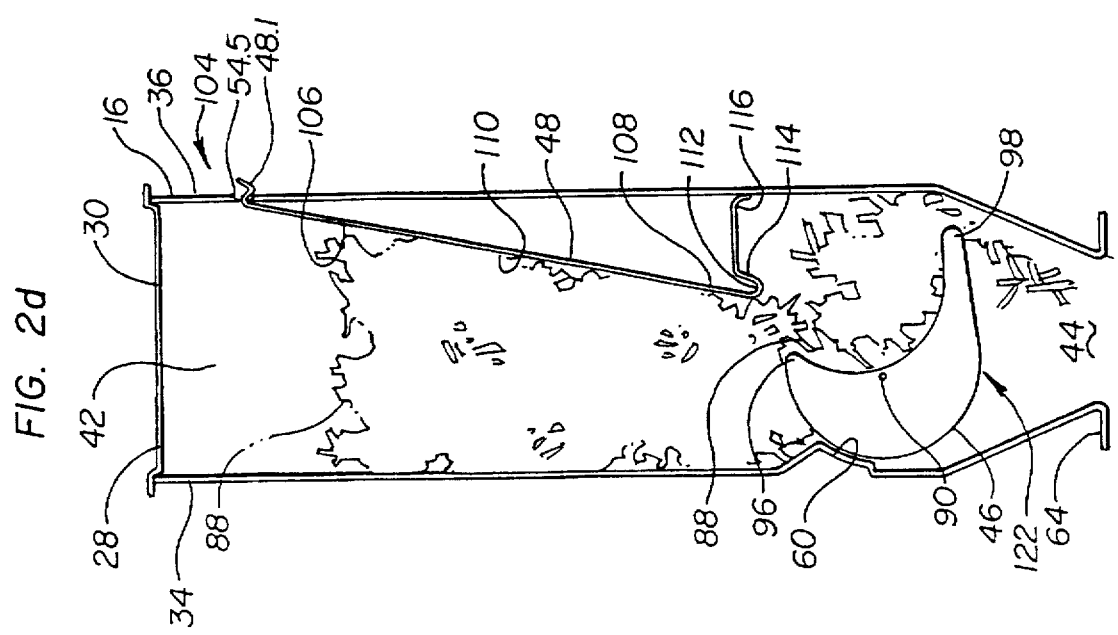
FIG. 2D is a section view taken at approximately 2—2 of FIG. 1 illustrating the dispenser drum in the catch position.
Figure 9:
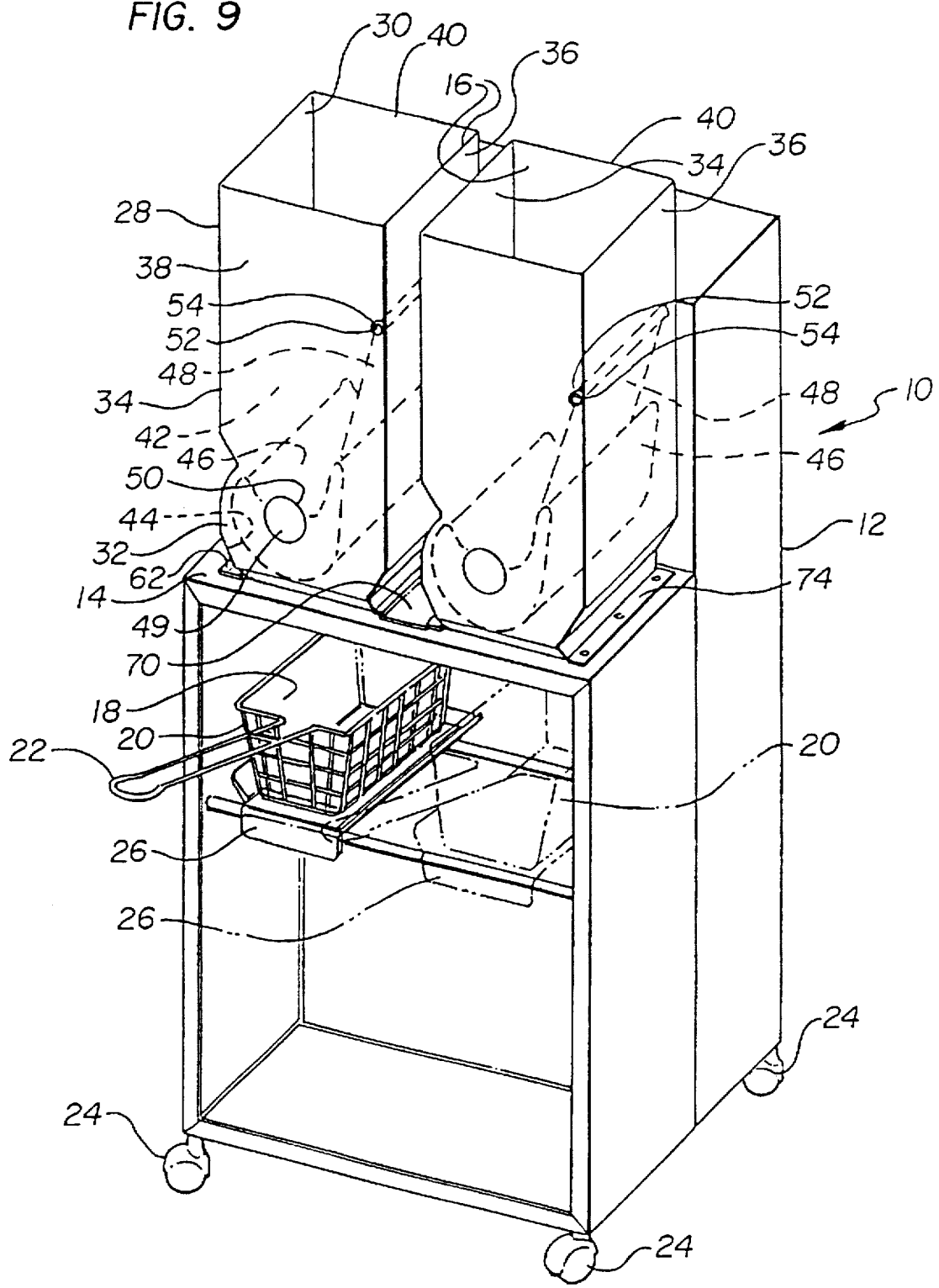
FIG. 9 is an alternative detail view of the hopper 16 as engaged to the hopper shelf 14.

Referring to FIGS. 2 and 9, the dispenser unit 10 is illustrated end wall 38 having first dispenser drum opening 50 formed therethrough. First sidewall 34 has an arcuate shaped dispenser drum surface 60 formed therein. First and second sidewalls 34, 36 respectively taper inwardly to define the exit opening 44 at the bottom 32 of the hopper 16. A first hold-down 62 is mounted on the hopper shelf 14 for engaging the mounting lip 64 of the first hopper 68. A second hold-down 70 is mounted between the first hopper 68 and the second hopper 72 to engage the respective mounting lips 64 of the first and second hoppers 68, 72. A third hold-down 74 is mounted to the hopper shelf 14 for holding a mounting lip 64 of the second hopper 72. Alternatively, a fourth hold-down 75 may be integral to the rearward portion of the hopper shelf 14. (FIG. 3) The fourth hold-down 75 may be provided for slidable receiving and mating coupling to an extension lip 64.1 which is integral to the bottom portion of the end wall 40 of the hopper 16. The hopper 16 may also include a forwardly extending extension lip 64.2 which is preferably adapted for releasable vertical coupling to a vertical lip 75.1 which is preferably integral to the forward portion of the hopper shelf 14. (FIG. 1) In this embodiment, the hopper 16 may be slidably and removably engaged to the hopper shelf 14 by positioning of the extension lip 64.1 adjacent to an below the fourth hold-down 75 whereon rearward positioning of the hopper 16 may occur. The extension lip 64.1 then slides rearwardly below the fourth hold-down 75 for penetrative coupling thereto. The forward extension lip 64.2 is then preferably rearwardly adjacent to the vertical lip 75.1 whereon downward force may be applied to the front portion of the hopper 16 and the forward extension lip 64.2 for engagement to the vertical lip 75.1, thereby, retaining the hopper 16 in a desired position relative to the hopper shelf 14.

Continuing to refer to FIG. 2, a hopper opening 76 is formed in the hopper shelf 14 aligned with the exit opening 44 of each hopper 16. A first food guide 78 and a second food guide 80 which are flanges integral to, and depending from, the hopper shelf 14, are preferably positioned below the hopper opening 76 to guide the food articles from the exit opening 44 to the food receptacle (not shown). A basket sensor 82 is mounted on the support structure 12 and positioned to engage a food receptacle (not shown) as it is placed onto the basket tray 26. A food level sensor 82.1 may be positioned in communication with the storage area 42 to measure the quantity of food articles 88 in the storage area 42. The food level sensor 82.1 may be laser, ultrasonic or other sensing means depending on the application. A temperature sensor 82.3 may be positioned in communication with the storage area 42 to monitor the temperature on food articles 88. Each basket tray 26 is aligned with a respective hopper opening 76 to receive food articles dropping from the exit opening 44.

Continuing to refer to FIG. 2, each basket tray 26 is mounted on a first basket rod 84 and a second basket rod 86 which are parallel to each other but positioned in a non-horizontal plane to encourage grease brought to the dispenser unit 10 on a food receptacle 18 to run to the back 182 of the basket tray 26.

Referring to FIGS. 2A–2E, the storage area 42 is illustrated having food articles 88 positioned therein. The cap 30 is mounted on the top 28 of the hopper 16 to isolate the food articles 88 from the outside, warmer ambient air. As illustrated in FIG. 2A, the dispenser drum has an axis of rotation 90, an outside surface 92 positioned at a first radius 94 from the axis of rotation 90. A sealing lip 96 is formed on the dispenser drum 46. A catching lip 98 is formed on the dispenser drum 46 at a second radius 100 from the axis of rotation 90. The second radius 100 is larger than the first radius 94 forming the dispenser drum in a non-cylindrical configuration. An open cavity 102 is formed in the dispenser drum 46 between the catching lip 98 and the sealing lip 96 to receive a predetermined quantity of food articles 88 from the storage area 42. The open cavity 102 may be configured along the entire length of the dispenser drum 46 or along a predetermined portion of the length of the dispenser drum 46 at the preference of an individual.

Continuing to refer to FIGS. 2A–2E, pivot tabs 48.1 preferably provide a pivotal connection 104 between the diverter 48 and the hopper 16. The pivotal connection 104 may comprise the coupling of the pivoting tabs 48.1 with the receiving slots 54.5. Alternatively, the pivotal connection 104 may be comprised of the diverter rod 54 which extends along and generally parallel to the second sidewall 36. The diverter rod 54 may extend through the first and second diverter opening 52, 58 respectively as shown in FIG. 9. The diverter 48 may be formed of stainless steel metal material or plastic. The pivotal connection 104 may alternatively comprise a peg extending from either side of the diverter 48 for engaging the respective diverter openings 52, 58. The diverter 48 has a top end 106, a lower end 108, and an inside surface 110. The lower end 108 may have a rounded top portion 112 and a dispenser drum bumper 114 for being engaged by the catching lip 98. The diverter 48 also has a spacer portion 116 for spacing the insider surface 110 from the second side wall 36.

Continuing to refer to FIGS. 2A–2E, the dispenser drum 46 is illustrated moving clockwise from a filling position 118, illustrated in FIGS. 2A and 2B, to an intermediate position 120 illustrated in FIG. 2C. The dispenser drum 46 continues rotating in the clockwise direction to a catching position 122 wherein the sealing lip 96 is spaced a predetermined distance from the rounded tip 112 on the lower end 108 of the diverter 48. The food articles 88 falling between the sealing lip 96 and the rounded tip 112 are caught by the catching lip 98. The dispenser drum 46 continues to rotate in the clockwise direction to a dump position 124 wherein gravity urges the food articles 88 to fall from the open cavity 102 through the exit opening 44. It should be understood, the sealing lip 96 and outside surface 92 of the dispenser drum 46 maintain a no-spill spacing with the arcuate sloped dispenser drum surface 60 on the first sidewall 34. The sealing lip 96 and outside surface 92 of the dispenser drum 46 further maintain a spaced relationship with the rounded tip portion 112 at the lower end 108 of the diverter 48. Continuing to refer to FIGS. 2A–2E, the dispenser drum 46 in the filling position 118 positions the open cavity 102 to be in communication with the storage area 42 for receiving food articles 88 dropping by the force of gravity into the open cavity 102. In the dump position 124, the open cavity 102 is in communication with the exit opening 44 to allow gravity to urge the food articles 88 to drop through the exit opening 44 and into the food receptacle 18. The rotation indicator 146 (FIGS. 3 and 5) is in communication with the logic portion 129 (FIG. 3) to control the drive portion 128 (FIG. 3) to rotate the dispenser drum 46 in the clockwise and counter-clockwise directions about axis of rotation 90.

Figure 3:
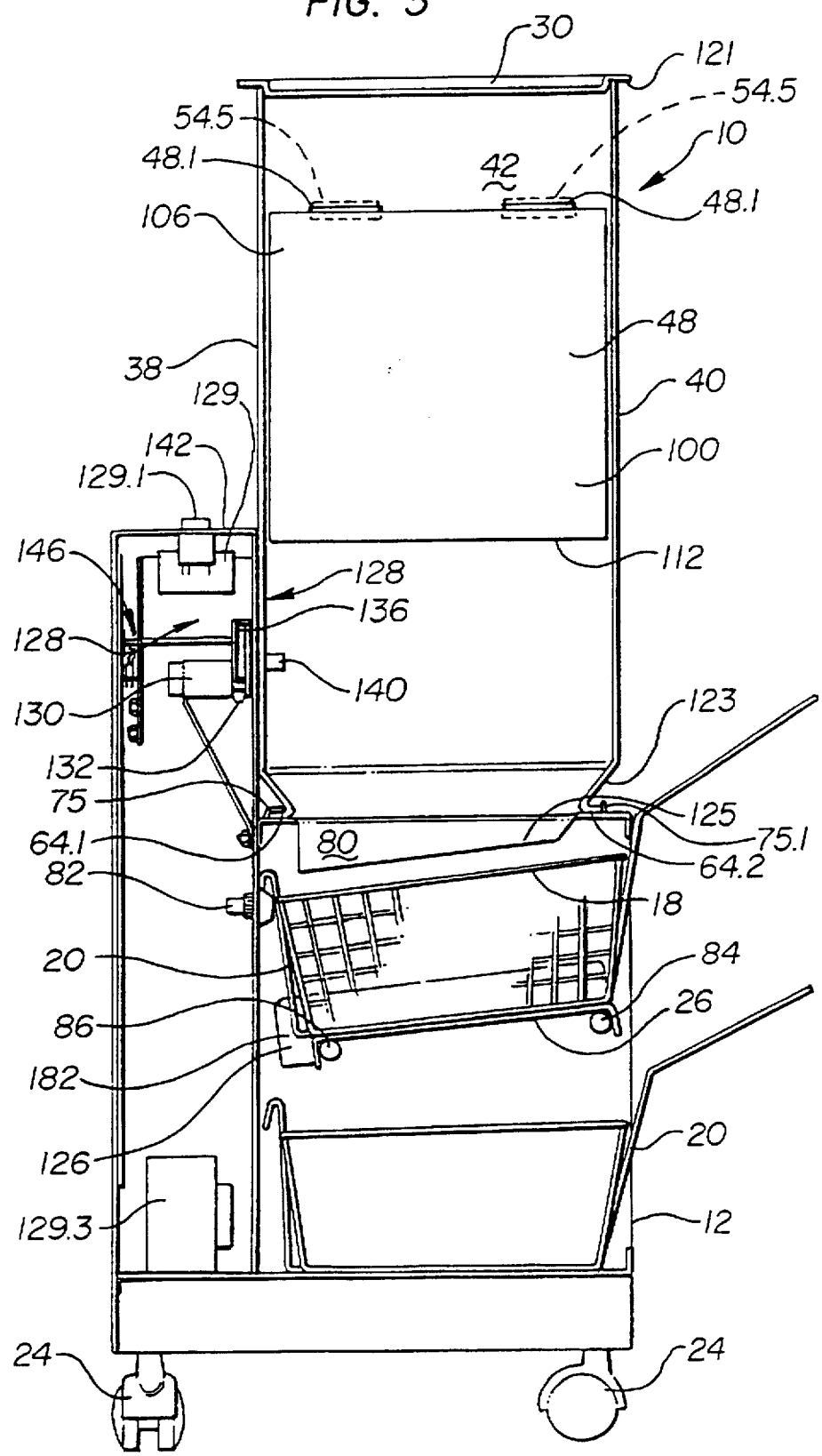
FIG. 3 is a section view taken at approximately 3—3 of FIG. 1.

Referring to FIG. 3, the dispenser unit 10 is illustrated in a section view taken at approximately 3—3 of FIG. 1. The cap 30 on the hopper 16 is illustrated having an overhanging lip 121 to seal the hopper 16 separating the storage area 42 from the outside environment. The exit opening 44 has inwardly tapering sides 123 for directing food articles 88 (FIG. 2A) into the food receptacle 18. The first food guide 78 (not shown in FIG. 3) and second food guide 80 may each have a lower edge 125 which is formed at an acute angle to the horizontal to allow the wire mesh basket 20 to easily slide into position under the exit opening 44. The basket tray 26 is mounted in a sloping configuration to urge grease to flow into the grease trap 126 formed on the back 182 of the basket tray 26. The sloping configuration of the basket tray 26 is formed by the first basket rod 84 mounted higher than the second basket rod 86. This sloping configuration of the basket tray 26 also facilitates the wire mesh basket 20 sliding into position in the basket tray 26 and engaging the basket sensor 82. Extra wire mesh baskets 20 may be stored under the basket tray 26 in the dispenser unit 10.

Continuing to refer to FIG. 3, a drive portion 128 and a logic portion 129 are mounted in the support structure 12. The logic portion 129 may comprise a circuit breaker 129.1 on the outside of a cabinet 142 and power supply 129.3 mounted inside the cabinet 142. The drive portion 128 comprises a motor 130 connected to a gear reducer 132 having a small gear connected to the motor 130 and a large gear 136 connected to the drive shaft. A drum drive 140 is mounted on the end of the drive shaft 138 and extends from the cabinet 142 housing the drive portion 128. The drum drive 140 is positioned to engage a socket 143 in the drive end 144 (FIG. 4) of the dispenser drum 46.

Figure 5:
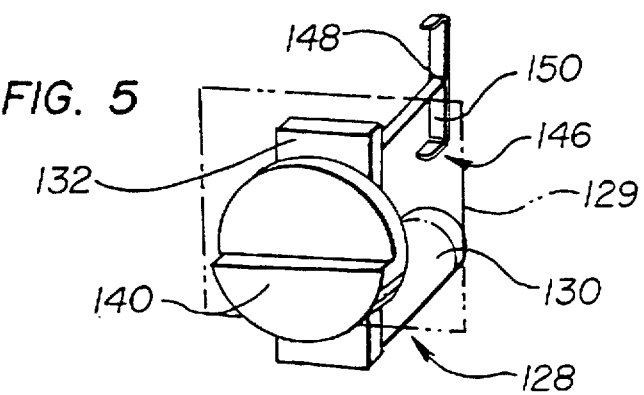
FIG. 5 is a perspective view of the drive portion removed from the support structure.

Referring to FIGS. 3 and 5, a rotation indicator indicated in general by the numeral 146 may comprise an indicator shaft 148 extending rearwardly from the drive shaft 138. The indicator shaft 148 may have a plurality of tabs 150 mounted thereon. The tabs 150 will rotate with the drive shaft 138 and may be configured to engage position sensors 152 in the logic portion 129 to indicate when the drive shaft 138 has rotated through a predetermined arcuate travel.

Figure 4:
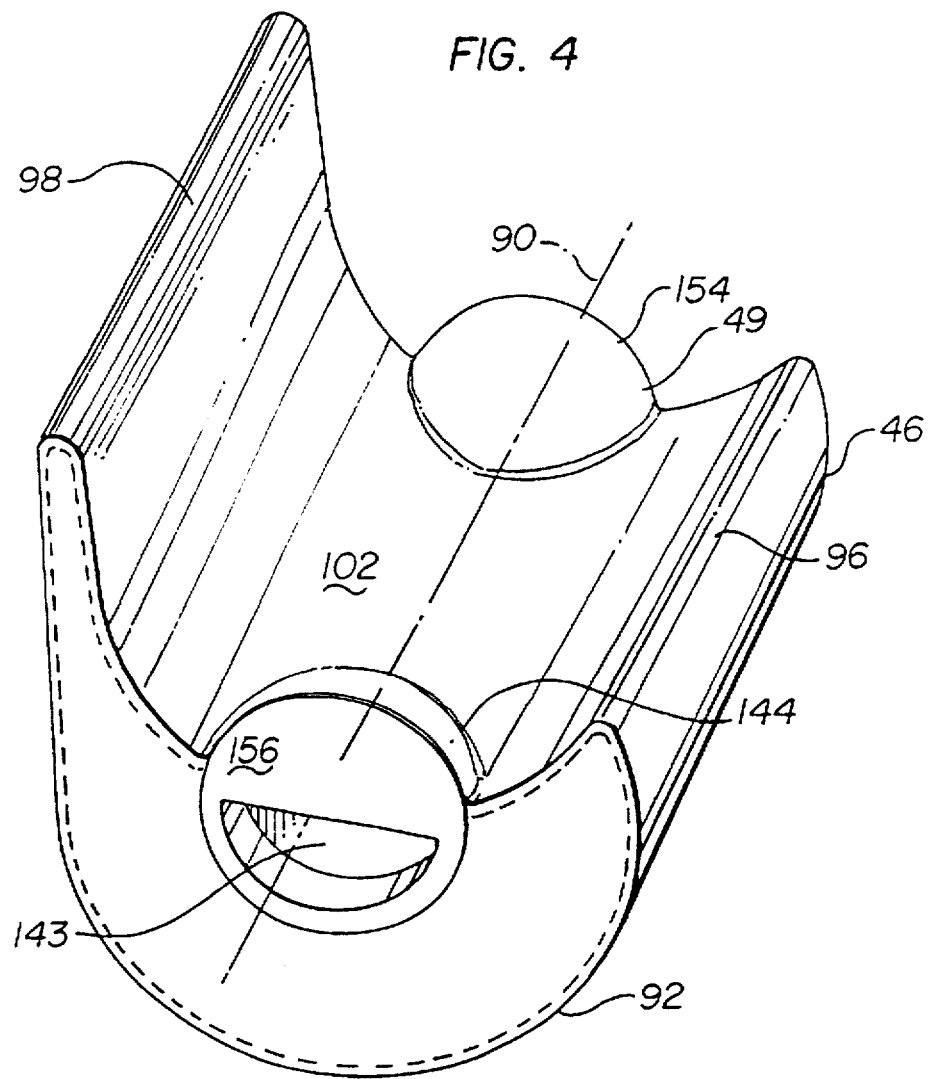
FIG. 4 is a perspective view illustrating the dispenser drum.

Referring to FIG. 4, the dispenser drum 46 may be formed from high density polyethylene, stainless steel or other easily cleanable materials. The dispenser drum 46 may be injection or rotationally molded or machined to fit the needs of the application. The dispenser drum 46 has an axis of rotation 90 extending longitudinally along the dispenser drum 46 through the idler end 49 and the drive end 144. The idler end 49 has a first hub 154 extending through the first drum opening 50. The drive end 144 has a second hub 156 extending therefrom along axis of rotation 90 for engaging second drum opening 56. The first hub 154 and second hub 156 interfit with the first drum opening 50 and second drum opening 56 respectively to rotationally and removably attach the dispenser drum 46 to the hopper 16 between the storage area 42 and the exit opening 44.

Figure 6:
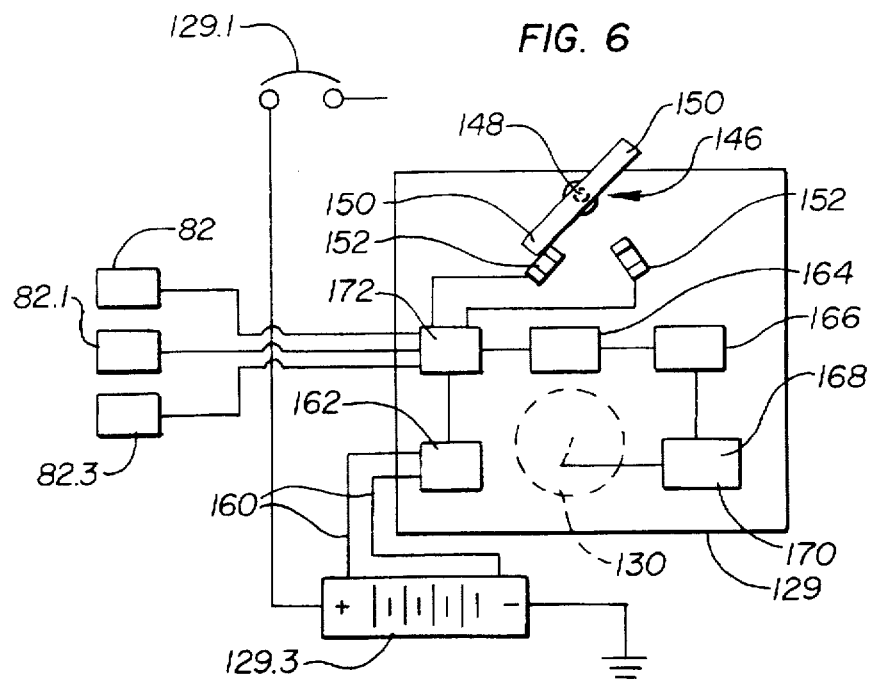
FIG. 6 is a schematic illustration of the logic portion.

Referring to FIG. 6, the logic portion 129 is illustrated having a circuit breaker 129.1 for supplying power to a power supply 129.3. The power supply 129.3 supplies power to the logic portion 129 and is connected by wires 160 to the power converter 162 in the logic portion 129 for supplying logic power to components in the logic portion 129. The logic portion 129 may have a processor 164, such as a programmable interface circuit (PIC) available from Motorola or NEC. The logic portion 129 may also have memory 166 for receiving and retaining a program for the processor 164. A motor driver 168 may be mounted on the logic portion 129 for controlling the direction and speed of the motor 130. The motor driver 168 may comprise FET (field effect transistors) 170 or transistors, SCR's relays or other similar power controlling devices depending on the application requirements. An input portion 172 is mounted on the logic portion 129 and connected to the processor 164 for connection to input devices such as the basket sensor 82, the food level sensor 82.1 or the storage area temperature sensor 82.3.

Figure 7:
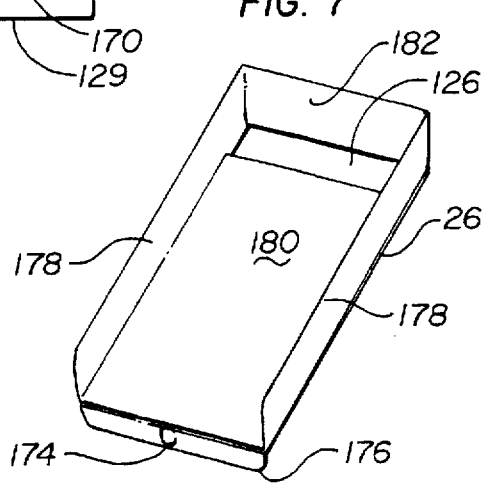
FIG. 7 is a perspective view of the basket tray.

Referring to FIG. 7, the basket tray 26 has an alignment hole 174 proximate the front flap 176. The basket tray 26 has sidewalls 178 formed at an angle to the bottom 180. The grease trap 126 is positioned in the back 182 of the basket tray 26 to receive grease drippings which will flow down the bottom 180 of the basket tray 26 from the front flap 176 to the back 182 when mounted on the first and second basket rods 84, 86 respectively as described above.

Figure 8:
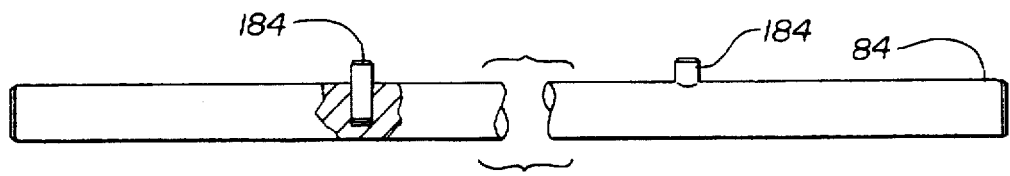
FIG. 8 is a broken plan view of the first basket rod.

Referring to FIG. 8, the first basket rod 84 may have an alignment post 184 fastened in a perpendicular relationship with the first basket rod 84. Each alignment post is positioned along the first basket rod 84 to align with the alignment hole 174 in the basket tray 26. This interfitting alignment post 184 and alignment hole 174 provide a secure, removable attachment of the basket tray 26 to the support structure 12. The alignment post 184 may be attached to the first basket rod 84 by welding, set screw or other means know to attach an alignment post in a perpendicular relationship to a first basket rod 84.

Referring to FIGS. 1–4, in operation the food articles 88 are placed in the storage area 42 and the hopper 16. The cap 30 is placed on the top 28 of the hopper 16 to keep the food articles 88 from warming due to warmer, ambient air. Power is applied to the power supply 129.3 and the circuit breaker 129.1 is engaged to supply power to the logic portion 129. A food receptacle 18 is placed on the basket tray 26 and pressed into position to engage the basket sensor 82. The processor 164 receives a signal from the temperature sensor 82.3 to determine if the food articles 88 are at a suitable temperature for dispensing. The processor 164 receives a signal from the food level sensor 82.1 indicating food articles 88 are in the storage area 42 of the hopper 16. The motor driver 168 energizes the motor 130 to rotate the drive shaft 138 connected to the dispenser drum 46 to a filling position 118 allowing food articles 88 to fall into the open cavity 102 in the dispenser drum 46.

The processor 164 reverses the direction of the motor 130 by engaging the motor driver 168. The motor driver 168 rotates the dispenser drum through the intermediate position 120 to the catch position 122 and further to the dump position 124 allowing the food articles 88 to fall from the open cavity 102 in the dispenser drum through the exit opening 44 in the hopper 16 past the first and second food guides 78, 80 into the food receptacle 18. The processor 164 receives a signal from a position sensor 152 engaged by a rotation tab 150 that the dispenser drum 46 has reached the dump position 124. The processor 164 engages the motor driver 168 to reverse the rotation direction of the dispenser drum 46 to return the dispenser drum to the filling position 118. Upon reaching the filling position 118, the catching lip 98 on the dispenser drum 46 bumps the diverter 48 causing the inside surface 110 to move with respect to the second sidewall 36 thereby jostling the food articles 88 in the storage area 42 of the hopper 16 causing the food articles 88 to separate from each other for freely falling into the open cavity 102. This cycle is repeated as each new food receptacle 18 is placed on the basket tray 26 and engages the basket sensor 82.

Referring to FIG. 4, the predetermined quantity of the food article 88 being dispensed from the storage area 42 to the exit opening 44 is determined by the size of the open cavity 102. At the time the open cavity 102 is formed in the dispenser drum 46, an allowance should be made for food articles 88 which fall between the sealing lip 96 and the diverter 48. These considerations may be used to form a dispenser drum 46 which can dispense a quantity of food articles having a consistent, predetermined measure.

Referring to FIGS. 2, 4 and 7, when the dispenser unit 10 is to be cleaned, the dispenser drum 46 is removed from the hopper 16, the hopper 16 is removed from the hopper shelf 14, the diverter 48 is removed from inside the hopper 16 and the basket tray 26 is removed from its angular mount on the first and second basket rods 84, 86 respectively. The dispenser drum 46 and hopper 16 may be washed or rinsed as necessary depending on the requirements of the application. The basket tray 26 and diverter 48 may be inserted into a dishwasher for cleaning.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A dispenser comprising:
    a) a support structure;
    b) a hopper on the support structure having a top, a bottom, a storage area and an exit opening;
    c) a dispenser drum rotatably mounted in the hopper between the exit opening and the storage area, the drum having a catching lip, a sealing lip and an axis of rotation;
    d) a drive portion in the support structure connected to the dispenser drum for rotating the dispenser drum between a filling position and a dump position.

2. The invention of claim 1 further comprising a position sensor connected to the drive portion, a logic portion on the support structure connected to the drive portion for engaging the position sensor and controlling the rotation of the dispenser drum.

3. The invention of claim 1 further comprising a grease trap removably mounted below the exit opening.

4. The invention of claim 2 further comprising a basket sensor in the support structure, the basket sensor connected to the logic portion and positioned below the exit opening.

5. The invention of claim 1 wherein the drum is releasably engaged to the hopper.

6. The invention of claim 1 wherein the hopper is releasably engaged to the support structure.

7. The invention of claim 2 further comprising a food level sensor in communication with the storage area, the level sensor connected to the logic portion.

8. The invention of claim 2 the drive portion further comprising a motor and a gear reducer, the gear reducer on the motor, the gear reducer having a drive shaft extending therefrom, a drum drive on the drive shaft, a drive end on the dispenser drum having a socket formed therein for engaging the drum drive.

9. The invention of claim 2 further comprising a temperature sensor in communication with the storage area, the temperature sensor connected to the logic portion.

10. The invention of claim 1 further comprising a diverter in the hopper, the diverter having a bumper spaced from a first sidewall, defining the storage area, the bumper positioned for engagement with the dispenser drum.

11. The invention of claim 10 wherein the diverter is pivotally mounted in the hopper.

12. The invention of claim 11, the hopper further comprising opposing end walls defining the storage area, the diverter having a top end pivotally mounted between the opposing end walls, wherein the diverter pivots in the hopper about the top end.

13. The invention of claim 1 further comprising a first sidewall and second sidewall and opposing end walls defining the storage area, the first sidewall, the second sidewall and the opposing end walls formed from an insulating material.

14. The invention of claim 13 further comprising a drum surface formed in the second sidewall, the drum surface having an arcuate shape concentric with an outside surface of the dispenser drum to maintain a spaced relationship with the dispenser drum and the sealing lip on the dispenser drum.

15. A dispenser for dispensing a predetermined quantity of articles comprising:
    a) a support structure;
    b) a hopper on the support structure, the hopper having a top, a bottom, a storage area and an exit opening;
    c) a dispenser drum rotatably mounted in the hopper, the dispenser drum having an axis of rotation, a sealing lip, a first radius from the axis of rotation and a catching lip at a second radius from the axis of rotation, the second radius being larger than the first radius; and d) a drive portion on the support structure for engaging and rotating the dispenser drum.

16. The invention of claim 15 further comprising an open cavity on the dispenser drum having a predetermined volume, the open cavity positioned between the sealing lip and the catching lip, the dispenser drum rotating to bring the open cavity in communication with the storage area in a filling position and in communication with the exit opening in a dump position.

17. The invention of claim 15 further comprising a diverter in the hopper having a pivotal connection connecting the diverter to the hopper and a lower end adjacent the dispenser drum, a bumper on the diverter, the bumper positioned for engagement by the catching lip whereby the catching lip bumps the diverter to jostle articles in the storage area.

18. The invention of claim 15 further comprising a logic portion on the support structure connected to the drive portion for controlling the rotation of the dispenser drum, the logic portion configured to rotate the dispenser drum alternately between a filling position and a dump position, a rotation indicator connected to the dispenser drum, and a sensor on the logic portion for engagement by the rotation indicator.

19. The invention of claim 15 further comprising a temperature sensor in communication with the storage area, the hopper formed from a thermally insulating plastic material.

20. A dispenser for dispensing food articles comprising:

a) a support structure having a hopper shelf and a basket tray, a hopper opening formed in the hopper shelf positioned over the basket tray;

b) a hopper removably mounted on the hopper shelf, the hopper having an exit opening aligned with the hopper opening, a pair of opposing end walls, a first sidewall and a second sidewall, the end walls and sidewalls connected together defining a storage area, one end wall having a first drum opening, the other end wall having a second drum opening;

c) a dispenser drum in the hopper having an idler end and a drive end, the idler end having a hub, extending through the first drum opening, the drive end having a second hub extending through the second drum opening to rotatably mount the dispenser drum in the hopper, the dispenser drum positioned between the storage area and the exit opening, the dispenser drum having an axis of rotation, an outside surface formed at a first radius to the axis of rotation, a sealing lip formed at the first radius, a catching lip formed at a second radius, the second radius being larger than the first radius, and an open cavity formed in the dispenser drum between the idler end, the drive end, the catching lip and the sealing lip;

d) a drive portion on the support structure connected to the drive end of the hub;

e) a diverter pivotally connected to the hopper, the diverter having an inside surface, and a lower end having a bumper positioned for engagement with the catching lip; and f) a logic portion on the support structure, the logic portion connected to the drive portion for controlling and limiting the rotation of the dispenser drum.

* * * * *